April 26, 1955 R. H. RECH 2,707,259
SINGLE PHASE MOTOR CONTROL
Filed May 24, 1951
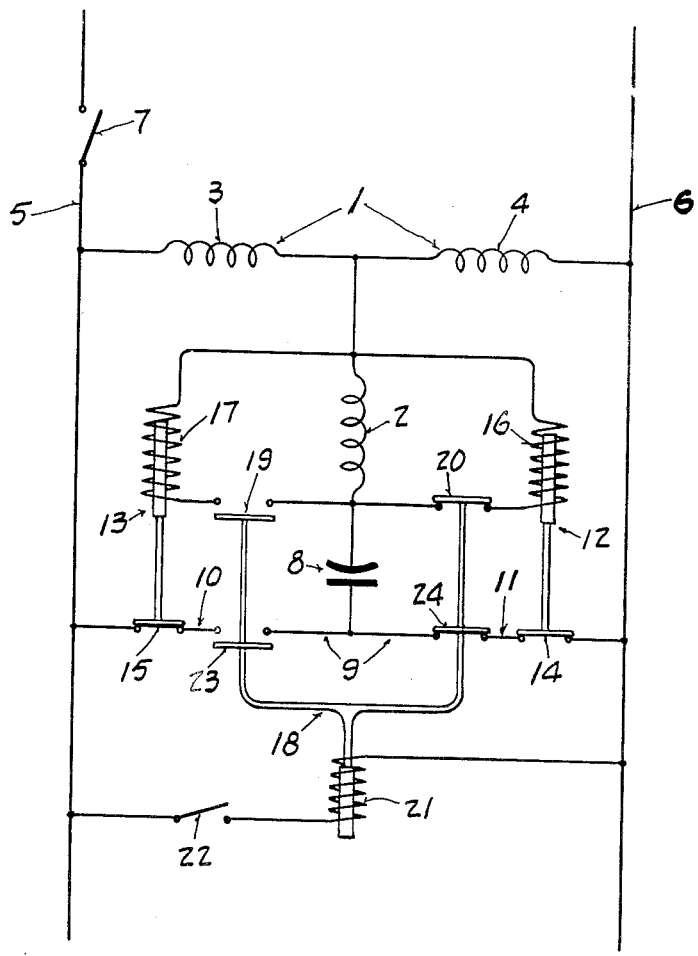
INVENTOR.
Robert H. Rech
BY Andrus & Sceales
ATTORNEYS.

United States Patent Office 2,707,259
Patented Apr. 26, 1955

2,707,259

SINGLE PHASE MOTOR CONTROL

Robert H. Rech, Milwaukee, Wis., assignor to A. O. Smith Corporation, Milwaukee, Wis., a corporation of New York Application May 24, 1951, Serial No. 228,041

2 Claims. (Cl. 318—207)

This invention relates to single phase motor controls, and particularly to a circuit for instantly reversing a capacitor-start motor of the type which utilizes a voltage relay to open the starting circuit as running speed is approached.

In order to quickly reverse a single phase induction motor, it is necessary that one of the two primary windings with which such motors are normally equipped be reversed relative to the other primary winding. Such a reversal, however, is rendered difficult by the fact that the starting primary winding is commonly out of the circuit as the motor comes up to speed, for example through operation of a speed responsive centrifugal starting switch or voltage relay. Reversal is therefore impossible until the starting winding is re-energized either by letting the motor slow down before the reversing switch is thrown or by incorporating means other than the speed responsive starting switch to re-energize the starting winding.

Reversing circuits adapted to perform the latter function may be classified as either instantly reversing or rapidly reversing, with instantly reversing circuits being those which accomplish reversal regardless of the speed with which the reversing switch is thrown. Rapidly reversing circuits, on the other hand, are those wherein the reversing switch must be operated relatively slowly in order to accomplish reversal. The necessity for this time delay in rapidly reversing circuits results from the fact that such circuits commonly comprise relays or the like which necessarily require a certain amount of time to function and which must operate during the interval between breaking of the circuit and re-making thereof for rotation in the opposite direction.

An object of the invention is to provide an instantly reversing circuit which may be simply and cheaply incorporated into a large variety of types and sizes of single phase induction motors either during the manufacture thereof or after the motors have been placed in service.

Another object is to provide a motor control which is particularly adapted to utilize voltage relays, thereby permitting use of the control on larger motors than those on which centrifugal switches and the like are employed.

The control circuit, in general, comprises a set of speed responsive switch contacts adapted to de-energize the starting winding as the motor comes up to speed in one direction and a corresponding set of contacts adapted to cut out the starting winding as running speed is approached in the reverse direction. Re-energization of the starting winding is accomplished independently of the closing time of either set of contacts through the alternate use of switching circuits comprising the closed set of speed responsive contacts instead of the open set thereof. The starting winding being re-energized, stopping and reversal of the motor are effected by reversing one primary winding relative to the other and thereby creating a plugging action.

These and other objects and advantages of the invention will be set forth more fully in the following description of the preferred embodiment of the invention illustrated schematically in the accompanying wiring diagram.

Referring to the drawing, the control is illustrated as employed on a typical single phase induction motor comprising a main primary winding 1, a starting primary winding 2, and a suitable rotor, not shown. The main winding 1 may be split into two segments 3 and 4 connected in series with each other across a source of single phase alternating current, represented by supply lines 5 and 6 having a line switch 7 therein.

In order to provide the motor with a starting torque, the start winding 2 is magnetically displaced from the main winding 1 and is arranged in series with a phase shifting reactor such as capacitor 8. The series combination of winding 2 and capacitor 8 is connected at one end to the juncture of main winding segments 3 and 4 and at the other end to a lead 9 bridged between supply lines 5 and 6.

Assuming that the instantaneous polarity of line 5 is positive, the direction of current flow through the main winding segments 3 and 4 will be from line 5 to line 6, whereas the direction of current flow in starting winding 2 will depend upon the closed or open condition of switch means in the left and right portions 10 and 11 of lead 9. With the right portion 11 of lead 9 closed and the left portion 10 thereof open, current will flow through a first circuit from line 5 through segment 3, winding 2, capacitor 8 and lead portion 11 to line 6. Upon opening of the right lead portion 11 and closing of the left lead portion 10, current will flow through a second circuit from line 5 through lead portion 10, capacitor 8, starting winding 2 and segment 4 to line 6. Since the starting winding 2 is in the common portion of the described first and second circuits, it is merely necessary to effect alternate opening and closing of the lead portions 10 and 11 in order to reverse the direction of current flow in start winding 2 relative to the direction of flow in main winding 1 and thereby reverse the direction of rotation of the motor.

The means for effecting opening and closing of the above mentioned first and second circuits include a pair of voltage relays 12 and 13 having contacts 14 and 15 connected, respectively, in lead portions 11 and 10. As shown in the drawing contacts 14 and 15 are both normally closed, that is to say they are closed when the rotor is commencing to accelerate in a given direction from a stopped condition.

In order to effect opening of the contacts 14 and 15 of the respective relays 12 and 13 as the motor comes up to speed, the coils 16 and 17 thereof are separately shunted across the starting winding 2. The increasingly strong voltage induced in the starting winding 2 as the rotor accelerates is accordingly impressed on the coils 16 and 17, causing them to open their contacts at a predetermined rotor speed.

It is important to the invention that at least one set of the speed responsive switch contacts 14 and 15 be closed at all times. Means are therefore provided for rendering relay 13 inoperative when the rotor is travelling in one direction and for preventing relay 12 from operating during rotation of the rotor in the reverse direction. These means may comprise a relay 18 having a pair of normally open contacts 19 arranged in series with relay coil 17 and a pair of normally closed contacts 20 connected in series with coil 16. The coil 21 of relay 18 is connected across supply lines 5 and 6, with the energization thereof being controlled by a reversing switch 22.

According to the invention, the circuit corresponding to which ever of relays 12 and 13 is inoperative for a given direction of rotor rotation is maintained open by suitable switching means until it is desired to reverse the motor. Thus relay 18 is provided with normally open contacts 23 arranged in lead 10 and with normally closed contacts 24 connected in lead 11. With this arrangement, closure of the open set of contacts 23 or 24 will immediately create a braking circuit which is independent of the closing or lag time of the voltage relays 12 or 13.

The operation of the instantly reversing circuit is as follows: assume that line switch 7 and reversing switch 22 are open and that the various relay contacts are in their normal positions as illustrated in the drawing. Upon closing of switch 7 current will flow through main winding 1 in a given direction, for example from line 5 to line 6. At the same instant the starting winding 2 will be energized by current flowing through a circuit, referred to as the first circuit, in a direction from line 5 through main winding segment 3, start winding 2, capacitor 8, and relay contacts 24 and 14 in lead portion 11 to line 6.

As the motor approaches running speed, voltage induced in the starting winding 2 from the rotor will cause relay 12 to open its contacts 14 and de-energize the starting winding. The voltage relay 13, however, will be inoperative to open its contacts 15 due to the opened condition of contacts 19. Energization of the starting winding 2 via the second of the circuits previously referred to will be prevented during this interval by the open contacts 23.

When it is desired to reverse the motor, switch 22 is closed to cause shifting of the various contacts 19, 23, 20 and 24 of relay 18. Contacts 23, in closing, effect immediate reverse energization of starting winding 2 by current flowing from line 5, through contacts 15 and 23 in lead portion 10, capacitor 8, starting winding 2, and main winding segment 4 to line 6. The closing time of relay 13 plays no part in this reversal of current direction in start winding 2 relative to main winding 1 since the contacts 15 of relay 13 remained closed during forward operation of the motor.

The winding 2 being reversed, the rotor is rapidly plugged to a stop and accelerated in the reverse direction. As the motor comes up to speed the relay 13, which is made operative by the closing of contacts 19, operates to open its contacts 15 and de-energize the starting winding as is the case of forward operation of the motor.

During reverse operation the relay 12 is made inoperative by the opened contacts 20, so that closing of the opened contacts 24 will again reverse the motor independently of the closing time of relay contacts 14.

Instead of reversing the starting winding 2 the main winding 1 may be reversed, it being only necessary to effect a relative reversal of said windings. The relay 18 and contacts thereof may be replaced by any suitable contacting elements, for example a drum or knife switch, without altering the invention in any way.

The described control arrangement is operable to reverse a single phase motor independently of the closing time of the various switch contacts in the circuit. To place the control on a capacitor start induction motor wherein the starting circuit is cut out by a voltage relay, it is merely necessary to add a single voltage relay to the elements already present in the motor.

Various embodiments of the invention may be employed within the scope of the following claims.

I claim:

1. In a control for a capacitor start single phase induction motor having a rotor and main and starting primary windings, said starting winding being connected in series with a capacitor in order to shift the phase of current flowing therein, first and second power circuits having a common portion comprising said starting winding, said first circuit being connected across a source of current with polarity to cause current flow through said starting winding in one direction, said second circuit being connected across said source of current with polarity to cause current flow through said starting winding in the reverse direction, a first voltage relay connected across said starting winding and having normally closed contacts arranged in said first circuit to open the same as said rotor approaches running speed in one direction, a second voltage relay connected across said starting winding and having normally closed contacts arranged in said second circuit to open the same as running speed is approached in the reverse direction, means to prevent said second relay from operating when said rotor is running in said one direction and to prevent said first relay from operating when said rotor is running in said reverse direction, normally closed switch contacts arranged in said first circuit in series with the contacts of said first relay, and normally open switch contacts arranged in said second circuit in series with the contacts of said second relay, whereby closing of said normally open switch contacts and opening of said normally closed switch contacts effects instant reversal of said rotor independently of the lag of either of said relays.

2. In a control for a single phase induction motor having a rotor and main and starting primary windings, said starting winding being connected in circuit with a reactor in order to shift the phase of current flowing therein, first and second power circuits having a common portion comprising said starting winding, first and second voltage relays connected across said starting winding and having normally closed contacts arranged, respectively, in said first and second circuits to open the same as said rotor approaches running speed, contact means adapted to maintain said second relay in de-energized condition when said rotor is rotating in one direction and to maintain said first relay in de-energized condition when said rotor is rotating in the reverse direction, switch means to reverse one of said windings relative to the other, normally closed switch contacts arranged in said first circuit in series with the contacts of said first relay, and normally open switch contacts arranged in said second circuit in series with the contacts of said second relay, said control being operable through reversal of said windings and alternate opening and closing of said switch contacts to effect instant reversal of said rotor independently of the lag of said voltage relays.

References Cited in the file of this patent

UNITED STATES PATENTS

| | | |
|---|---|---|
| 2,276,057 | McCormick | Mar. 10, 1942 |
| 2,285,687 | Snyder | June 9, 1942 |
| 2,473,244 | Fuller | June 14, 1949 |
| 2,509,898 | Wiseman | May 30, 1950 |
| 2,545,639 | Wolff et al. | Mar. 20, 1951 |
| 2,640,177 | Wiseman | May 26, 1953 |
| 2,674,710 | Pitman | Apr. 6, 1954 |